United States Patent
Kimura

(10) Patent No.: US 12,085,727 B2
(45) Date of Patent: *Sep. 10, 2024

(54) LIGHT IRRADIATION APPARATUS

(71) Applicant: DISCO CORPORATION, Tokyo (JP)

(72) Inventor: Nobuyuki Kimura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,997

(22) Filed: Jul. 21, 2022

(65) Prior Publication Data
US 2023/0048701 A1  Feb. 16, 2023

(30) Foreign Application Priority Data

Aug. 11, 2021  (JP) ................... 2021-131048

(51) Int. Cl.
*G02B 17/00*  (2006.01)
*G02B 17/06*  (2006.01)
*G02B 27/10*  (2006.01)
*G02B 27/42*  (2006.01)

(52) U.S. Cl.
CPC ..... *G02B 27/1086* (2013.01); *G02B 17/0621* (2013.01); *G02B 17/0636* (2013.01); *G02B 17/0673* (2013.01); *G02B 27/4244* (2013.01)

(58) Field of Classification Search
CPC ............ G02B 27/1086; G02B 27/4244; G02B 17/0621; G02B 17/0636; G02B 17/0673; G02B 19/0047; G01J 3/10; G01J 3/18; G01J 3/0208; G01J 3/0229; G01B 11/06; G01B 2210/56; H01L 22/12

See application file for complete search history.

(56) References Cited

U.S. PATENT DOCUMENTS

| | | | | |
|---|---|---|---|---|
| 4,070,111 A | * | 1/1978 | Harrick | G01J 3/2889 356/309 |
| 4,120,586 A | * | 10/1978 | Lessner | G01J 3/18 248/219.2 |
| 4,225,233 A | * | 9/1980 | Ogan | G01J 3/06 356/334 |

(Continued)

FOREIGN PATENT DOCUMENTS

| DE | 3304110 A1 | 8/1984 |
|---|---|---|
| DE | 3734588 A1 | 4/1989 |

(Continued)

OTHER PUBLICATIONS

The American Heritage Desk Dictionary 65 (1981). (Year: 1981).*

(Continued)

*Primary Examiner* — Cara E Rakowski
*Assistant Examiner* — Wesley Scott Ashton
(74) *Attorney, Agent, or Firm* — Greer, Burns & Crain, Ltd.

(57) ABSTRACT

A light irradiation apparatus that splits white light into light rays of a plurality of wavelengths to apply the light ray includes a white light source, a diffraction grating that splits white light emitted by the white light source into light rays of a plurality of wavelengths, and a light selector that selects a light ray of a specified wavelength from the light rays of the plurality of wavelengths split by the diffraction grating.

6 Claims, 2 Drawing Sheets

(56) References Cited

U.S. PATENT DOCUMENTS

| | | | | |
|---|---|---|---|---|
| 4,995,721 | A | * | 2/1991 | Krupa ............... G02B 17/0621 |
| | | | | 356/328 |
| 5,285,255 | A | * | 2/1994 | Baranne ............... G01J 3/0208 |
| | | | | 356/334 |
| 5,784,159 | A | * | 7/1998 | Iwasaki ............... G01J 3/06 |
| | | | | 356/328 |
| 5,896,438 | A | * | 4/1999 | Miyake ............... G03F 7/70075 |
| | | | | 378/34 |
| 6,404,498 | B1 | | 6/2002 | Maeda et al. |
| 7,233,394 | B2 | * | 6/2007 | Odhner ............... G01J 3/0256 |
| | | | | 356/328 |
| 7,248,352 | B2 | | 7/2007 | Hamamatsu et al. |
| 7,755,775 | B1 | * | 7/2010 | Li ............... G01N 21/956 |
| | | | | 356/625 |
| 8,072,607 | B2 | * | 12/2011 | Krause ............... G01J 1/08 |
| | | | | 356/432 |
| 8,430,509 | B2 | * | 4/2013 | Hirose ............... A61B 3/14 |
| | | | | 351/246 |
| 9,709,441 | B2 | * | 7/2017 | Acher ............... G01J 3/1804 |
| 2004/0159797 | A1 | * | 8/2004 | Wolleschensky ..... G01J 3/4406 |
| | | | | 359/618 |
| 2005/0190259 | A1 | | 9/2005 | Mitsuhashi et al. |
| 2007/0165224 | A1 | * | 7/2007 | Deck ............... G01J 3/02 |
| | | | | 356/334 |
| 2010/0133243 | A1 | * | 6/2010 | Nomaru ............... B23K 26/032 |
| | | | | 219/121.67 |
| 2016/0169814 | A1 | * | 6/2016 | Hashimoto ........... H01J 61/025 |
| | | | | 250/358.1 |
| 2019/0242749 | A1 | * | 8/2019 | Huang ............... G01J 3/18 |
| 2020/0134773 | A1 | | 4/2020 | Pinter et al. |
| 2020/0379270 | A1 | * | 12/2020 | Kent ............... G01J 3/021 |
| 2020/0386618 | A1 | | 12/2020 | Meng et al. |
| 2021/0118710 | A1 | * | 4/2021 | Doi ............... G01N 23/2251 |
| 2023/0045148 | A1 | * | 2/2023 | Kimura ............... G02B 5/005 |

FOREIGN PATENT DOCUMENTS

| | | | | |
|---|---|---|---|---|
| DE | 112018007301 | T5 | 2/2021 | |
| GB | 2034066 | A * | 5/1980 | ............... G01J 3/12 |
| JP | 2002192370 | A | 7/2002 | |
| JP | 3408805 | B2 | 5/2003 | |
| JP | 2004040163 | A * | 2/2004 | |
| JP | 2005184032 | A | 7/2005 | |
| JP | 2012008078 | A | 1/2012 | |
| JP | 2017219330 | A | 12/2017 | |
| JP | 2017220480 | A | 12/2017 | |
| JP | 2020106374 | A | 7/2020 | |
| WO | 2008052526 | A1 | 5/2008 | |

OTHER PUBLICATIONS

David Walker, Tungsten Filament Microscope Lamps in the Early 12st Century: A Case for the Defence, 2013, pp. 1-9 [online], [retrieved May 28, 2023], retrieved from the Internet <URL: www.microscopy-uk.org.uk/mag/indexmag.html?http://www.microscopy-uk.org.uk/mag/artjan14/dw-lightcompare.html>. (Year: 2013).*

White Light, 2016, pp. 1-5 [online], [retrieved May 29, 2023], retrieved from the Internet <URL: http://web.archive.org/web/20170228093003/https://byjus.com/physics/white-light/ >. (Year: 2016).*

Spherical Mirror Equation, 2016, pp. 1-2 [online], [retrieved May 30, 2023], retrieved from the Internet <URL: http://hyperphysics.phy-astr.gsu.edu/hbase/geoopt/mireq.html >. (Year: 2016).*

Yaunbo Deng et al., Coherence Properties of Different Light Sources and Their Effect on the Image Sharpness and Speckle of Holographic Displays, 2017, pp. 1-12 [online], [retrieved Jun. 2, 2023], retrieved from the Internet <URL: https://www.nature.com/articles/s41598-017-06215-x>. (Year: 2017).*

A Patent Translate Machine English Translation (MET) of DE 27 34 588 A1, with DE 27 34 588 A1 appended therewith. (Year: 2023).*

Steve Gellman, Slit-pinhole Photography, 2015, pp. 1-8 [online], [retrieved Jan. 2, 2024], retrieved from the Internet <URL: https://www.alternativephotography.com/slit-pinhole-photography/>. (Year: 2015).*

Cotton Gin and Eli Whitney, 2019, pp. 1-5, [online], [retrieved Jan. 1, 2024], retrieved from the Internet <URL: https://www.history.com/topics/inventions/cotton-gin-and-eli-whitney>. (Year: 2019).*

Igor V. Mimin et al., Experimental Observation of Flat Focusing Mirror Based on Photonic Jet Effect, 2020, pp. 1-20 [online], [retrieved Oct. 4, 2023], retrieved from the Internet <URL: https://doi.org/10.1038/s41598-020-65292-7>. (Year: 2020).*

The 10 Most Effective Methods to Reduce Manufacturing Costs, 2020, pp. 1-8 [online], [retrieved Oct. 4, 2023], retrieved from the Internet <URL: https://web.archive.org/web/20200929140703/https://bautomation.com/effective-ways-to-reduce-manufacturing-costs/>. (Year: 2020).*

Plane Mirror, 2020, pp. 1-14 [online], [retrieved Jan. 2, 2024], retrieved from the Internet <URL: https://www.sciencefacts.net/plane-mirror.html>. (Year: 2020).*

The Simplification Principle, 2021, pp. 1-22 [online], [retrieved Oct. 4, 2023], retrieved from the Internet <URL: https://www2.deloitte.com/content/dam/Deloitte/ch/Documents/strategy-operations/deloitte-ch-en-the-simplification-principle.pdf>. (Year: 2021).*

Office Action issued in counterpart German patent application No. 10 2022 208 121.8, dated Feb. 20, 2023.

German App. No. 10 2022 207 871.3: English translation of Office Action issued in counterpart, dated Mar. 21, 2023 (3 pages).

* cited by examiner

LIGHT IRRADIATION APPARATUS

BACKGROUND OF THE INVENTION

Field of the Invention

The present invention relates to a light irradiation apparatus that splits white light into light rays of a plurality of wavelengths to apply the light ray.

Description of the Related Art

A wafer formed with a plurality of devices such as an integrated circuit (IC) and large-scale integration (LSI) on a front surface thereof in a state in which the devices are partitioned by a plurality of crossing streets is ground on the back surface side thereof to a desired thickness, is then divided into individual device chips by a dicing apparatus or a laser processing apparatus, and the divided device chips are utilized for electric apparatuses such as mobile phones and personal computers.

The laser processing apparatus applies a laser beam of such a wavelength as to be transmitted through the wafer to the wafer, with the focal point of the laser beam positioned inside the wafer corresponding to the street, to form modified layers along the streets (see, for example, Japanese Patent No. 3408805).

In addition, for accurately positioning the focal point of the laser beam inside the wafer, a technology for measuring the thickness of a wafer has been proposed by the present applicant (see Japanese Patent Laid-Open No. 2020-106374).

SUMMARY OF THE INVENTION

In carrying out the technology described in Japanese Patent Laid-Open No. 2020-106374, spectroscopic means for splitting white light into light rays corresponding to a plurality of wavelengths with a time difference is necessary, and a light irradiation apparatus including conventional spectroscopic means has needed a complicated configuration for splitting with a time difference, so that there has been a problem that the thickness measuring device would be expensive.

Accordingly, it is an object of the present invention to provide an inexpensive light irradiation apparatus with a simple configuration for splitting white light into light rays corresponding to a plurality of wavelengths with a time difference to apply the light ray.

In accordance with an aspect of the present invention, there is provided a light irradiation apparatus that splits white light into light rays of a plurality of wavelengths to apply the light ray. The light irradiation apparatus includes a white light source, a diffraction grating that splits white light emitted from the white light source into light rays of a plurality of wavelengths, and a light selector that selects a light ray of a specified wavelength from the light rays of the plurality of wavelengths split by the diffraction grating.

Preferably, the light selector selects a light ray of a specified wavelength from the light rays of the plurality of wavelengths split by the diffraction grating by a pinhole mask. Preferably, the light selector includes a first focusing mirror that reflects the light rays of the plurality of wavelengths split by the diffraction grating, a second focusing mirror that has a same focal distance as the first focusing mirror and that is disposed at a position of point symmetry with a focal point as a center of symmetry, an optical path conversion mirror that changes an optical path positioned at the focal point of the second focusing mirror, and the pinhole mask that selects a light ray of a specified wavelength from the light rays of the plurality of wavelengths of which the optical paths are converted by the optical path conversion mirror.

Preferably, the light selector further includes a third focusing mirror disposed between the optical path conversion mirror and the pinhole mask, and a focal point of the third focusing mirror is positioned at the pinhole mask. Preferably, the optical path conversion mirror includes any one of a galvanoscanner, a resonant scanner, and a polygon mirror. Preferably, the white light source is selected from any one of a superluminescent diode light source, an amplified spontaneous emission light source, a light-emitting diode light source, a supercontinuum light source, a halogen light source, a xenon light source, a mercury light source, and a metal halide light source.

The light irradiation apparatus of the present invention is configured to include the white light source, the diffraction grating that splits the white light emitted from the white light source, and the light selector that selects the light ray of a specified wavelength from the light rays of a plurality of wavelengths split by the diffraction grating, and, therefore, there is provided a light irradiation apparatus simple in configuration and inexpensive.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

A light irradiation apparatus according to embodiments of the present invention will be described in detail with reference to the attached drawings. The light irradiation apparatus of the present invention can adopt various forms, and, first, referring to FIG. 1, a light irradiation apparatus 1A configured as a first embodiment will be described.

Figure 1:
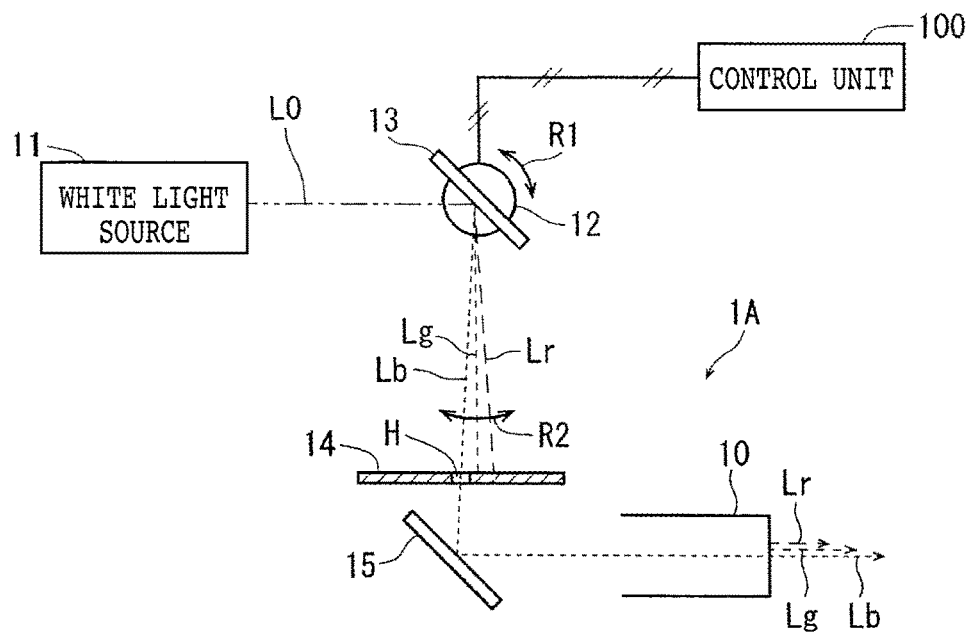
FIG. 1 is a conceptual diagram depicting an optical system of a light irradiation apparatus according to a first embodiment.

The light irradiation apparatus 1A depicted in FIG. 1 is a light irradiation apparatus that splits white light into light rays of a plurality of wavelengths and applies the light rays, and includes at least a white light source 11, a diffraction grating 13 that splits the white light L0 emitted from the white light source 11, and a light selector that selects the light ray of a specified wavelength from the light rays of the plurality of wavelengths split by the diffraction grating 13, for example, blue light Lb, green light Lg, and red light Lr.

The white light source 11 according to the present embodiment is a light source that applies light L0 in which light of wavelengths called visible rays, for example, 400 to 800 nm are substantially uniformly mixed, and is preferably any one of, for example, a superluminescent diode (SLD) light source, an amplified spontaneous emission (ASE) light source, a light-emitting diode (LED) light source, a super-continuum light source, a halogen light source, a xenon light source, a mercury light source, and a metal halide light source. The white light L0 emitted from the white light source 11 is applied being adjusted to parallel light.

The light selector disposed in the light irradiation apparatus depicted in FIG. 1 includes, for example, a pinhole mask 14 provided with a pinhole H, and angle adjusting means 12 that modifies an angle of the diffraction grating 13 into a direction indicated by an arrow R1 so as to adjust irradiation directions of light rays of a plurality of wavelengths (blue light Lb, green light Lg, and red light Lr) split by the diffraction grating 13. The angle adjusting means 12 is an electric motor, which is connected to and controlled by a control unit 100 functioning as a control driver. With the angle adjusting means 12 operated based on an instruction signal from the control unit 100, the angle of the diffraction grating 13 is changed to the direction indicated by the arrow R1 as indicated in FIG. 1, and accordingly, the angle of the light ray to be split by the diffraction grating 13 is adjusted to a direction indicated by an arrow R2. Note that, in FIG. 1, for convenience of description, the white light L0 is to be split into three light rays, blue light Lb, green light Lg, and red light Lr. However, as described above, the white light L0 includes light rays of all wavelengths contained in a visible ray mixed uniformly, so that the white light L0, in practice, is more finely split into a plurality of colors (purple, light blue, yellow, orange, and the like).

With the electric motor constituting the angle adjusting means 12 operated, the angles of the light rays split by the diffraction grating 13 are changed, and as depicted in the figure, from the light rays of a plurality of wavelengths split by the diffraction grating 13, the light ray of a specified wavelength (for example, blue light Lb) is selected by the pinhole H of the pinhole mask 14. Then, with the angle of the diffraction grating 13 changed at high speed by the angle adjusting means 12, the light ray reflected by an optical path conversion mirror 15 and applied from a light irradiation part 10 is changed from the blue light Lb through the green light Lg to the red light Lr with a time difference.

According to the light irradiation apparatus 1A configured as the first embodiment described above, an inexpensive light irradiation apparatus capable of splitting white light into light rays corresponding to a plurality of wavelengths with a time difference and applying the light ray can be provided, with a simple configuration.

The light irradiation apparatus according to the present invention is not limited to the light irradiation apparatus 1A according to the first embodiment described above. A light irradiation apparatus 1B configured as a second embodiment of the light irradiation apparatus will be described, based on FIG. 2.

Similarly to the light irradiation apparatus 1A described based on FIG. 1, the light irradiation apparatus 1B includes the white light source 11, the diffraction grating 13, and the pinhole mask 14 that selects the light rays of the plurality of wavelengths (the blue light Lb, the green light Lg, the red light Lr, and the like) by the pinhole H. Further, in addition to this, the light irradiation apparatus 1B includes a first focusing mirror 16 that reflects the light rays of the plurality of wavelengths split by the diffraction grating 13, a second focusing mirror 17 that has the same focal distance as the first focusing mirror 16 and is disposed at a position of point symmetry with a focal point indicated by a point C in the figure as a center of symmetry, the optical path conversion mirror 15 that is positioned at the focal point of the second focusing mirror 17 and converts the optical path, and the angle adjusting means 12 that changes the reflection angle of the optical path conversion mirror 15. Note that the angle of the diffraction grating 13 of the light irradiation apparatus 1B is fixed to be different from that of the light irradiation apparatus 1A described above. According to the light irradiation apparatus 1B configured as the second embodiment, the light rays of the plurality of wavelengths (the blue light Lb, the green light Lg, the red light Lr) diffracted and split by the diffraction grating 13 are focused by a recessed focusing surface 16a of the first focusing mirror 16, is led to the second focusing mirror 17, and further, the light ray focused by a recessed focusing surface 17a of the second focusing mirror 17 is led to the pinhole mask 14 described above. The light selector in the second embodiment includes the first focusing mirror 16, the second focusing mirror 17, the optical path conversion mirror 15, the angle adjusting means 12, and the pinhole mask 14. The optical path conversion mirror 15 is preferably selected from any of a galvanoscanner, a resonant scanner, and a polygon mirror which are capable of conversion of the reflection angle at high speed.

Figure 2:
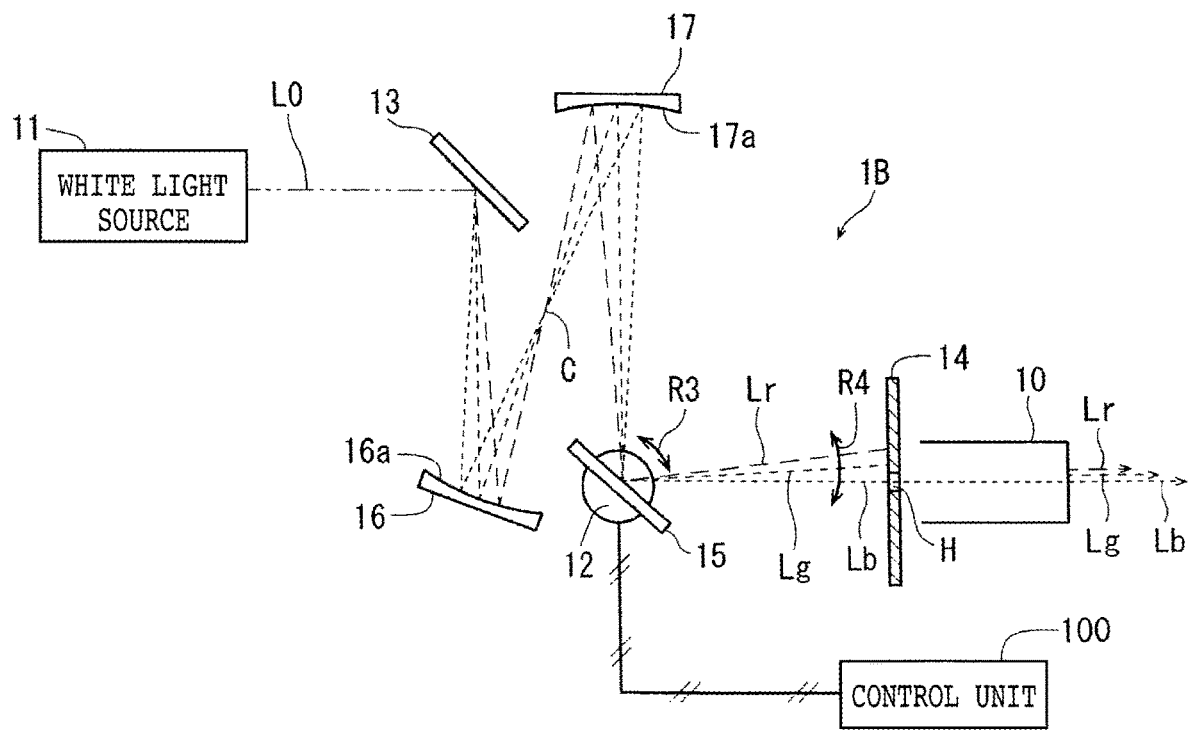
FIG. 2 is a conceptual diagram depicting an optical system of a light irradiation apparatus according to a second embodiment.

The light irradiation apparatus 1B depicted in FIG. 2 is used as the light irradiation apparatus of the present invention, the white light source 11 is operated, and the angle adjusting means 12 is operated based on an instruction signal from the control unit 100 to change the angle of the optical path conversion mirror 15 into a direction indicated by an arrow R3, whereby the angle of the light ray reflected by the optical path conversion mirror 15 is adjusted into a direction indicated by an arrow R4, and similarly to the first embodiment described above, the wavelength of the light ray selected by the pinhole H of the pinhole mask 14 is changed, so that the white light applied from the light irradiation part 10 can be changed into the blue light Lb, the green light Lg, and the red light Lr with a time difference. As a result, similarly to the first embodiment described above, an inexpensive light irradiation apparatus splitting the white light into the light rays corresponding to the plurality of wavelengths with a time difference and applying the light ray can be provided with a simple configuration.

Further, the light irradiation apparatus according to the present invention is not limited to those according to the first and second embodiments described above. A light irradiation apparatus 1C configured as a third embodiment of the light irradiation apparatus of the present invention will be described based on FIG. 3.

Figure 3:
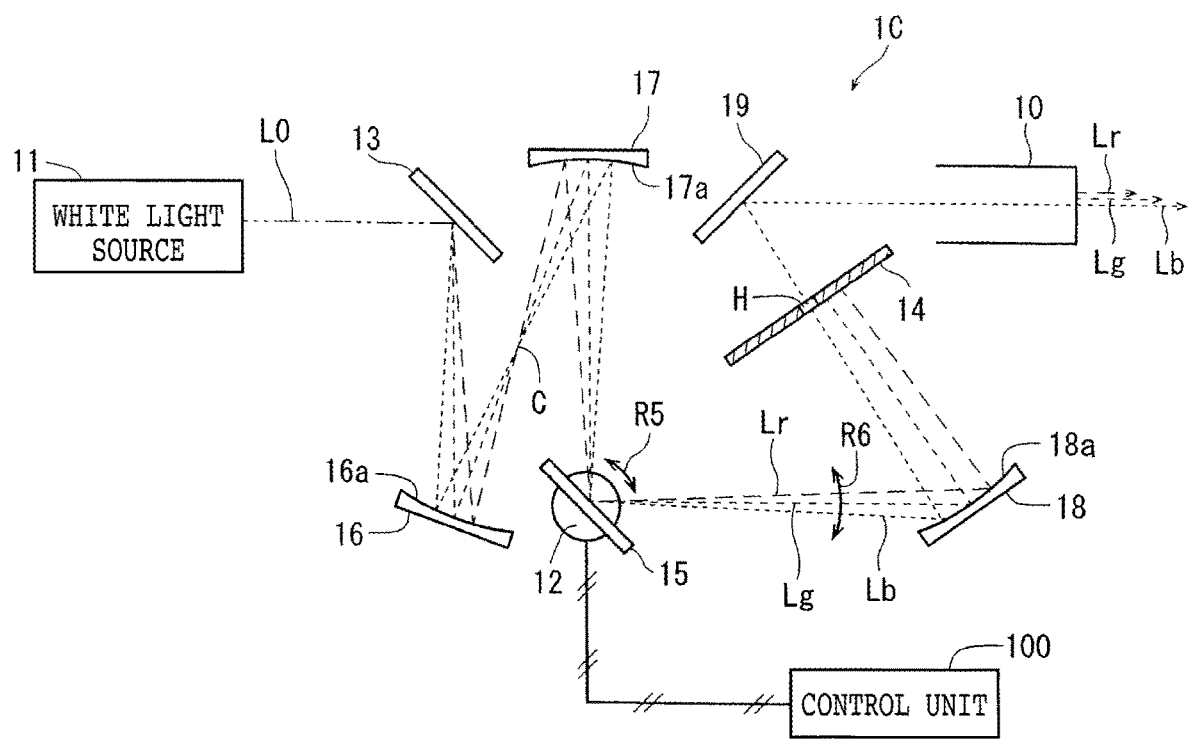
FIG. 3 is a conceptual diagram depicting an optical system of a light irradiation apparatus according to a third embodiment.

As is understood from FIG. 3, the light irradiation apparatus 1C includes a third focusing mirror 18 between the optical path conversion mirror 15 and the pinhole mask 14, in addition to the configuration disposed in the light irradiation apparatus 1B described based on FIG. 2, with the focal point of the light focused by a recessed focusing surface 18a of the third focusing mirror 18 set to be positioned at the pinhole mask 14, and further includes a reflection mirror 19 that reflects the light passing through the pinhole H of the pinhole mask 14. Note that the reflection mirror 19 is for adjusting the optical path into a freely selected direction, and is not an indispensable configuration in the present invention. Thus, the light passing through the pinhole H of the pinhole mask 14 may be applied as it is from the light irradiation part 10.

Also in the light irradiation apparatus 1C depicted as the third embodiment, with the angle of the optical path conversion mirror 15 changed into a direction indicated by an arrow R5, based on an instruction signal from the control unit 100, the angle of the light reflected by the optical path conversion mirror 15 is changed into a direction indicated by an arrow R6. The light selector in the third embodiment includes the third focusing mirror 18, in addition to the first focusing mirror 16, the second focusing mirror 17, the optical path conversion mirror 15, the angle adjusting means 12, and the pinhole mask 14 which have been described above.

In the above-described light irradiation apparatus 1C, the blue light Lb, the green light Lg, the red light Lr, and the like are focused at the pinhole H disposed in the pinhole mask 14 by the third focusing mirror 18. Therefore, as compared to the above-described light irradiation apparatus 1A and 1B constituting the first and second embodiment, respectively, it becomes possible to more limitedly select the wavelength of the light passing through the pinhole H of the pinhole mask 14, and an inexpensive light irradiation apparatus that splits the white light into the light rays corresponding to the plurality of wavelengths with a time difference more clearly and applies the light ray is provided.

The optical path conversion mirror 15 configuring the light selector in the light irradiation apparatus 1C according to the third embodiment described above, also, is preferably selected from any of a galvanoscanner, a resonant scanner, and a polygon mirror which are capable of conversion of the reflection angle at high speed. With such a configuration selected, the light ray of a specified wavelength of the plurality of wavelengths continuously applied from the light irradiation part 10 can be used with a slighter time difference, so that, in the case of applying the light irradiation apparatus to measurement of the thickness of a wafer, it is possible to measure the thickness of the wafer more efficiently.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A light irradiation apparatus that splits white light into light rays of a plurality of wavelengths to apply the light ray, the light irradiation apparatus comprising:
    a white light source;
    a diffraction grating that splits white light emitted from the white light source into light rays of a plurality of wavelengths; and
    a light selector that selects a light ray of a specified wavelength from the light rays of the plurality of wavelengths split by the diffraction grating;
    wherein the light selector selects a light ray of a specified wavelength from the light rays of the plurality of wavelengths split by the diffraction grating by a pinhole mask;
    wherein the light selector includes:
        a first focusing mirror that reflects the light rays of the plurality of wavelengths split by the diffraction grating,
        a second concave focusing mirror that is disposed at a position of point symmetry with the first focusing mirror with a focal point of the first focusing mirror as a center of symmetry,
        an optical path conversion mirror that changes an optical path positioned at the focal point of the second focusing mirror, and
        the pinhole mask that selects a light ray of a specified wavelength from the light rays of the plurality of wavelengths of which the optical paths are converted by the optical path conversion mirror; and
    wherein the light selector further includes a third focusing mirror disposed between the optical path conversion mirror and the pinhole mask, and a focal point of the third focusing mirror is positioned at the pinhole mask.

2. The light irradiation apparatus according to claim 1, wherein the optical path conversion mirror includes any one of a galvanoscanner, a resonant scanner, and a polygon mirror.

3. The light irradiation apparatus according to claim 1, wherein the white light source is selected from the group consisting of a superluminescent diode light source, an amplified spontaneous emission light source, a light-emitting diode light source, a supercontinuum light source, a halogen light source, a xenon light source, a mercury light source, and a metal halide light source.

4. A light irradiation apparatus that splits white light into light rays of a plurality of wavelengths to apply the light ray, the light irradiation apparatus comprising:
    a white light source;
    a diffraction grating that splits white light emitted from the white light source into light rays of a plurality of wavelengths; and
    a light selector that selects a light ray of a specified wavelength from the light rays of the plurality of wavelengths split by the diffraction grating;
    wherein the light selector includes:
        a first focusing mirror that receives the light rays from the diffraction grating and reflects the light rays of the plurality of wavelengths split by the diffraction grating,
        a second concave focusing mirror that receives the light rays from the first focusing mirror, wherein the second focusing mirror is disposed at a position of point symmetry with the first focusing mirror with a focal point of the first focusing mirror as a center of symmetry,
        an optical path conversion mirror that receives the light rays from the second focusing mirror, the optical conversion mirror being positioned at the focal point of the second focusing mirror, the optical conversion mirror being variable positioned so as to change an optical path of light rays reflected by the optical conversion mirror, and
    a pinhole mask that receives the light rays from the optical conversion mirror and selects a light ray of a specified wavelength from the light rays of the plurality of wavelengths of which the optical paths are converted by the optical path conversion mirror.

5. The light irradiation apparatus according to claim 4, wherein the second focusing mirror is spaced apart from the first focusing mirror by the focusing distance of the first focusing mirror, and
    wherein the optical conversion mirror is spaced apart from the second focusing mirror by the focusing distance of the second focusing mirror.

6. The light irradiation apparatus according to claim 5, wherein the light selector further includes a third focusing mirror disposed between the optical path conversion mirror and the pinhole mask, and wherein the pinhole mask is spaced apart from the third focusing mirror by the focusing distance of the third focusing mirror.

* * * * *